J. H. WEBSTER.
MANUFACTURE OF SALT.
APPLICATION FILED SEPT. 19, 1912.

1,104,854.

Patented July 28, 1914.

WITNESSES:
John C. Sanders
Chauncey P. Carter

INVENTOR:
John Herbert Webster
ATTY.

UNITED STATES PATENT OFFICE.

JOHN HERBERT WEBSTER, OF CARRICKFERGUS, IRELAND.

MANUFACTURE OF SALT.

1,104,854.  Specification of Letters Patent.  Patented July 28, 1914.

Application filed September 19, 1912. Serial No. 721,290.

*To all whom it may concern:*

Be it known that I, JOHN HERBERT WEBSTER, a subject of the King of England, residing at Carrickfergus, county Antrim, Ireland, United Kingdom of Great Britain and Ireland, have invented new and useful Improvements in and Connected with the Manufacture of Salt, of which the following is a specification.

This invention has reference to the manufacture of common salt—chlorid of sodium—by the fusion process, that is, by melting rock salt, or other kinds of common salt, by heat; and has primarily for its object and effect to provide improvements by which salt of a high quality as regards color—whiteness — and purity, can be continuously — in contradistinction to intermittently—produced.

According to this invention, discolored rock salt, or salt made by artificial or natural evaporation, or otherwise, is melted by heat in a furnace or chamber, and as it is melted it flows into a secondary chamber or furnace wherein it is continuously agitated and operated upon by air, by forcing it through it, or by mechanical agitating means, or both; and from this chamber—wherein it is maintained in a full fluid state by heat—it is arranged to flow continuously into another chamber or vessel—also heated, and flow through it quietly, and to continuously and quietly discharge or flow from it. In this passage through the latter chamber or vessel, in a quiet manner, the foreign solid and discoloring matters contained in it, fall to the bottom, and are retained, while the purified white salt passes off at the upper level, and is collected, or broken up, or granulated, and treated as desired, for the production of salt in the different kinds of grain or body required in commerce.

In some cases, the molten salt flowing from the melting furnace, may be first run into a chamber or bath wherein the heavier impurities or foreign solid matters, or some of them, will deposit, and be separated; and then run into a second chamber or vessel, wherein it is agitated or treated as described; and then flow into and through another chamber or vessel wherein it is finally clarified by the settling out of the solid or discoloring matters contained in it, as specified.

Figure 1:
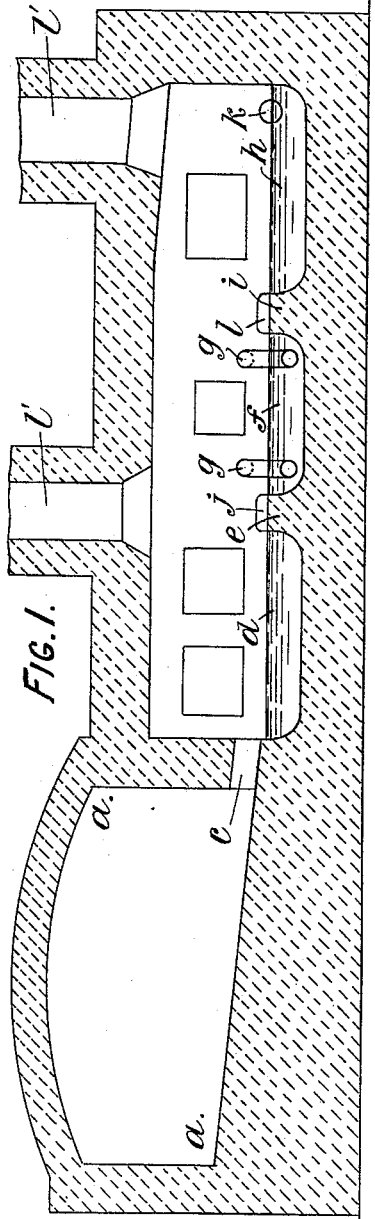
Figure 2:
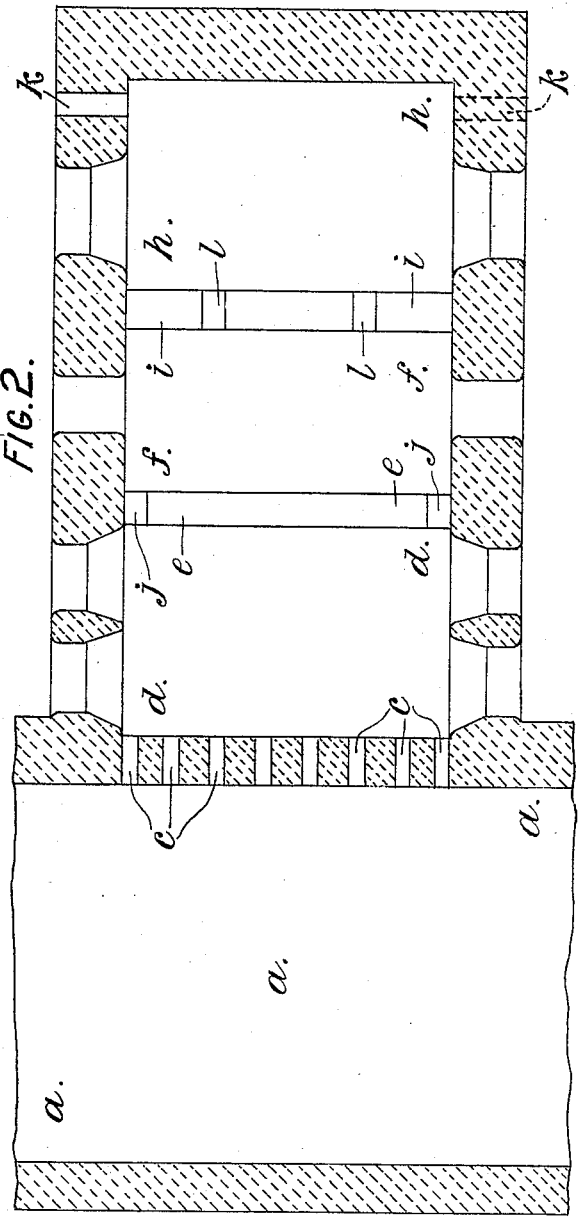

A furnace or plant having these characteristics is illustrated in the annexed drawings, which show it in longitudinal section in Figure 1, and in plan in Fig. 2.

In these drawings, $a$ represents the furnace chamber in which the salt is introduced and melted. From this melting furnace or chamber, the molten salt passes by a port or ports $c$ into a chamber or bath $d$, wherein the heavier impurities or foreign solid matter, or some of them, will deposit, and be separated. It then runs from this into a second chamber or vessel $f$ over a dam or wall $e$, or rather through gutters or channels $j$ provided in it for this purpose of passing from one bath to the other. In his bath or chamber $f$ it—the molten salt—is agitated or treated as above described—say by air under pressure passed through it from pipes $g$, the lower parts of which are within the liquid, and from which the air is discharged through holes in them; and this air—or whatever agitation is adopted—is preferably continuously applied; but it may in some cases be intermittently applied. From this bath or chamber $f$ it flows into another chamber $h$, through gutters or channels $l$ in the division wall $i$, wherein it is finally clarified by the settling out of the remaining solid or discoloring matters contained in it (which the agitating or blowing action renders possible or assists) as specified; and in passing through this bath or chamber $h$ from the inlet gutters or channels $l$ to the outlet or outlets $k$, which is or are placed preferably as far as possble from the point of inlet, or a long way from it; its flow will be quiet, and so it is in a condition in which the foreign or other matters referred to, contained in it, can deposit, and so separate from the purified and white salt; and in this state it will flow from the outlet conduit or conduits—the level or levels of which will be near the upper level of liquid salt—in a continuous and quiet discharge.

From the chamber or bath $d$, or in fact any of the baths or chambers through which the molten salt passes, in undergoing the purifying and whitening actions or processes, the deposited and separated matters may be removed simply by "fishing" them out with suitable ladles or instruments; or, if desired, they may be run out through suitable tapping holes or channels. In the apparatus shown, the chambers or baths in which this treatment and purification are carried on, are comparatively shallow, and the molten salt overflows from one to the other, through the channels or gutters in the dams or division walls; and these channels or gutters are preferably disposed at points which are not opposite each other, as shown by the plan in Fig. 2; so that the flow through them is not direct, but more or less circuitous or oblique. In other words, the inlet or outlet channels or gutters are "staggered" in relation to each other, so that the liquid all over the bath will be in a state of flow, and be constantly as a body moving forward slowly through the successive baths, and so that as full opportunity as is possible for the foreign and discoloring matters contained in the salt to deposit and separate out, is afforded.

In the case shown, the upper portion of the chambers or spaces of the furnace or plant, in which the operations take place, is common to all of them; that is, they are all in free and open communication with each other; and the heating medium necessary to maintain the liquid at the required temperature, may be introduced at any suitable point or points, either through separate gas or oil and air ports, or from the furnace $a$, or in any suitable way; and the products of combustion will be carried off by the outlet conduits $l'$.

What is claimed is:—

1. Process for the manufacture of pure white salt—chlorid of sodium—consisting in agitating salt while it is in a molten state and in a state of flow; subsequently causing it to pass slowly and quietly through a bath or chamber; and then discharging it continuously.

2. Process for the manufacture of pure white salt—chlorid of sodium—consisting in mechanically agitating flowing molten salt; and subsequently passing the flowing molten salt slowly and quietly through a bath or chamber and continuously discharging the flowing molten purified white salt.

3. Continuous process for the manufacture of pure white salt—chlorid of sodium—consisting in agitating flowing molten salt; passing the flowing molten salt, after it has been agitated, through a bath or chamber; and then continuously discharging the molten purified white salt.

4. Continuous process for the manufacture of pure white salt—chlorid of sodium—consisting in agitating flowing molten salt by blowing or forcing air through it; passing the flowing molten salt, after it has been agitated, through a bath or chamber; and then continuously discharging the molten purified white salt.

5. Process for the manufacture of pure white salt—chlorid of sodium—consisting in agitating flowing molten salt by blowing or forcing air through it and mechanically agitating the flowing body of molten salt; slowly and quietly passing the flowing molten salt, after it has been agitated, through a bath or chamber; and then continuously discharging the molten purified white salt.

6. Process for rendering common salt pure and white consisting in passing a body of molten salt through a trough for settling of coarse impurities, agitating the flowing body of molten salt after settling out the coarse impurities by blowing air through the flowing body, and passing the flowing body of molten salt through a second trough for settling out the remaining impurities after agitating the flowing body of molten salt.

7. Process for rendering common salt pure and white consisting in passing a body of molten salt through a trough for settling of coarse impurities, agitating the flowing body of molten salt after settling out the coarse impurities by mechanical means and by blowing air through the flowing body and passing the flowing body of molten salt through a second trough for settling out the remaining impurities after agitating the flowing body of molten salt.

In testimony whereof I have signed my name to this specification in the presence of two subscribing witnesses.

JOHN HERBERT WEBSTER.

Witnesses:
 ALFRED W. BROWN,
 H. G. BARCROFT, Jr.